(12) United States Patent
Wakamatsu

(10) Patent No.: US 7,905,142 B2
(45) Date of Patent: Mar. 15, 2011

(54) SERVO TYPE VOLUMETRIC FLOWMETER EMPLOYING A PUMP UNIT SYSTEM

(75) Inventor: Takeshi Wakamatsu, Tokyo (JP)

(73) Assignee: Oval Corporation, Tokyo (JP)

( * ) Notice: Subject to any disclaimer, the term of this patent is extended or adjusted under 35 U.S.C. 154(b) by 141 days.

(21) Appl. No.: 12/521,796

(22) PCT Filed: Jan. 25, 2008

(86) PCT No.: PCT/JP2008/051608
§ 371 (c)(1),
(2), (4) Date: Jun. 30, 2009

(87) PCT Pub. No.: WO2008/096666
PCT Pub. Date: Aug. 14, 2008

(65) Prior Publication Data
US 2010/0043568 A1 Feb. 25, 2010

(30) Foreign Application Priority Data

Feb. 5, 2007 (JP) ................................. 2007-025185

(51) Int. Cl.
G01F 3/14 (2006.01)
G01F 1/34 (2006.01)
(52) U.S. Cl. ........................................ 73/239; 73/861.42
(58) Field of Classification Search ........................ None
See application file for complete search history.

(56) References Cited

U.S. PATENT DOCUMENTS

| 2,809,492 | A | * | 10/1957 | Arkawy | 60/39.281 |
|---|---|---|---|---|---|
| 3,015,233 | A | * | 1/1962 | Ryder et al. | 73/861.59 |
| 3,266,309 | A | * | 8/1966 | Fishman et al. | 73/861.59 |
| 3,699,812 | A | * | 10/1972 | Masnik | 73/861.59 |
| 4,062,236 | A | * | 12/1977 | Clingman, Jr. | 374/37 |
| 4,125,018 | A | * | 11/1978 | Clingman, Jr. | 374/37 |
| 4,627,267 | A | * | 12/1986 | Cohrs et al. | 73/1.22 |
| 5,284,053 | A | * | 2/1994 | Wadlow et al. | 73/199 |
| 2008/0163931 | A1 | * | 7/2008 | Brocard et al. | 137/10 |
| 2010/0037705 | A1 | * | 2/2010 | Wakamatsu | 73/861.77 |

FOREIGN PATENT DOCUMENTS

| JP | 57-104320 | | 6/1982 |
|---|---|---|---|
| JP | 62-51231 | | 3/1987 |
| JP | 6-288807 | | 10/1994 |
| JP | 3331212 | | 5/2002 |
| JP | 2002156257 A | * | 5/2002 |

OTHER PUBLICATIONS

International Search Report mailed Apr. 1, 2008 for International Application No. PCT/JP2008/051608.

* cited by examiner

Primary Examiner — Harshad Patel
(74) Attorney, Agent, or Firm — Wenderoth, Lind & Ponack, L.L.P.

(57) ABSTRACT

A volumetric flowmeter (1) is equipped with a detachable pump unit (2), a main body casing (3) accommodating the pump unit (2), and a cover member (4). The main body casing (3) is equipped with a front side main body casing (8) accommodating the pump unit (2) and integrated with a differential pressure detector (6), and a rear side main body casing (10) connected to the front side main body casing (8) and allowing mounting therewithin of a servomotor (9) constituting a main body of a shaft driving unit (5). The pump unit (2) is inserted into a unit accommodating recess (11) of the front side main body casing (8) and is then covered with the cover member (4) to be thereby completely accommodated.

17 Claims, 15 Drawing Sheets

SERVO TYPE VOLUMETRIC FLOWMETER EMPLOYING A PUMP UNIT SYSTEM

TECHNICAL FIELD

The present invention relates to a servo type volumetric flowmeter, and more specifically, to a servo type volumetric flowmeter having a pump portion constituted as a pump unit of a detachable structure.

BACKGROUND ART

As one of its components, a volumetric flowmeter has a pump portion. The pump portion is equipped with a measuring chamber provided in a flow path and a pair of rotors causing a fixed volume of fluid to flow out for each rotation in the measuring chamber. The volumetric flowmeter can measure flow rate from rotation of the rotors. More specifically, the volume defined by the measuring chamber and the rotors is regarded as a reference volume, and it is possible to obtain flow rate from the rpm of the rotors while discharging fluid flowing into the measuring chamber according to the rotation of the rotors.

Owing to a capability of direct measurement of volume flow rate and high accuracy thereof, the volumetric flowmeter is widely used as a flowmeter for industrial and transaction uses.

As a volumetric flowmeter which accurately detects the pressure loss between the outlet and inlet of the flowmeter in order that stable flow rate measurement may be effected without being influenced by the physical values of the fluid, such as viscosity and density, and which imparts drive force from the outside to the rotors so as to keep the pressure loss at zero, making it possible to measure the flow rate at this time from the operational rpm of the rotors, there is known a servo type volumetric flowmeter as disclosed in Japanese Patent No. 3,331,212.

DISCLOSURE OF THE INVENTION

The construction of the pump portion in the above-mentioned conventional technique will be described more specifically; it is equipped with a casing having an inflow pipe, an outflow pipe, and a measuring chamber, a pair of rotors (gears), rotor shafts provided on the rotors, and bearings for the rotor shafts.

In this pump portion, the fluid flows within the casing through the inlet of the inflow pipe, so the casing functions as a pressure container. In order to fully function as a pressure container, the thickness of the portions constituting the casing is set sufficiently large. This is for the purpose of minimizing deformation of the fluid due to pressure. As a result, the pump portion has to be rather large, resulting in an overall increase in size. (This problem is not restricted to the volumetric flowmeter of Japanese Patent No. 3,331,212.)

An increase in the size of the pump portion makes the operation of replacing the pump portion rather difficult to perform.

Further, in the pump portion of the above-mentioned conventional technique, there is adopted a bearing structure in which the rotor shafts are supported in a cantilever-like fashion, which leads to the following problem: In order to minimize the rattling of the rotor shafts, it is necessary to set the shaft length large, which leads to an increase in the casing size, resulting in a pump portion which is large also on the rotor shaft drive side.

Further, the pump portion of the conventional technique has the following problem: The rotor shaft of one of the pair of rotors is used as the drive shaft, and this rotor shaft serving as the drive shaft extends to the outside of the casing to receive the drive force of the servomotor, so a seal member has to be attached to the rotor shaft to prevent fluid leakage; the presence of this seal member considerably affects the rotation of the rotor shaft. Further, the presence of the seal member makes it necessary to take durability into consideration.

The present invention has been made in view of the above-mentioned problems in the prior art. It is an object of the present invention to provide a servo type volumetric flowmeter which is not only of high accuracy but also helps to achieve a reduction in the size of the pump portion and to facilitate the replacement of the pump portion.

In order to achieve the above-mentioned object, there is provided, according to the present invention, a servo type volumetric flowmeter equipped with a detachable pump unit having a pump portion, that is, a servo type volumetric flowmeter employing a pump unit system, which has the following features.

According to a first aspect of the present invention, there is provided a servo type volumetric flowmeter employing a pump unit system including a pump unit formed by providing inside a pump portion casing a pump portion having a first rotor and a second rotor having rotation shafts and a measuring chamber formed so as to surround the first rotor and the second rotor, in which: the pump unit has a fluid inflow port communicating with the measuring chamber, a fluid outflow port, and a pressure guide port formed in the pump portion casing, with one of the rotor shafts extending to an exterior of the pump portion casing as a drive shaft; the servo type volumetric flowmeter employing a pump unit system, which is equipped with the pump unit as described above, is further equipped with a main body casing, a unit accommodating recess formed in the main body casing and detachably accommodating the pump unit, a cover member covering the unit accommodating recess and fixed to the main body casing, an inflow path formed in the main body casing and guiding a fluid to be measured toward the pump unit, an outflow path formed in the main body casing and guiding the fluid to be measured to an exterior of the main body casing from the pump unit in the recess of the unit accommodating recess, a shaft driving means mounted to the main body casing and driving one of the rotor shafts extending from the pump portion casing, a differential pressure detecting means for detecting a differential pressure between front and rear sides of the first rotor and the second rotor, and a control means for controlling the shaft driving means based on the differential pressure; and due to a presence of the pressure guide port, both inner and outer surfaces of the pump unit, which is accommodated in the unit accommodating recess and covered with the cover member, are kept wet, with the fluid pressures applied to inner and outer sides of the pump unit being equalized.

According to the present invention, which has the above-mentioned features, the pump unit having the pump portion is accommodated in the unit accommodating recess of the main body casing, and is covered with the cover member; the unit accommodating recess and the cover member form the portion functioning as the pressure container. In the pump unit, the fluid flows within the same, and at the same time, the outside space thereof is filled with the fluid, which means both the inner and outer sides thereof are wet. The pump unit is constructed so that the fluid pressures applied to the inner and outer sides are equalized.

According to the present invention, for example, it is the cover member functioning as the pressure container, that undergoes temporary deformation due to the fluid, and the pump unit itself undergoes no deformation. Thus, it is possible to provide a servo type volumetric flowmeter capable of high precision measurement.

According to the present invention, there is no need for the pump portion casing of the pump unit to be formed as a pressure container, so it is possible to reduce the wall thickness, for example, of the pump portion casing. As a result, the pump unit can be relatively small.

According to the present invention, it is possible to replace the pump unit by removing the cover member. Since the pump unit is small, the workability at the time of replacement is satisfactory.

According to a second aspect of the present invention, in the servo type volumetric flowmeter employing a pump unit system of the first aspect, a main body mounting portion formed on the main body casing in order to mount the main body of the shaft driving means is isolated from the unit accommodating recess to shut off the fluid to be measured, and the shaft driving means is constructed such that one of the rotor shafts is driven through a magnetic joint.

According to the present invention, which has the above-mentioned features, there is no need to attach a seal member to one of the rotor shafts serving as the drive shaft. That is, there is obtained a structure in which durability is taken into consideration. According to the present invention, the rotor shaft is driven through a magnetic joint, so not only is it free from liquid leakage, but provides a structure in which the rotor shaft rotates smoothly. Thus, it is possible to provide a servo type volumetric flowmeter capable of achieving an improvement in terms of performance and maintenance.

According to a third aspect of the present invention, in the servo type volumetric flowmeter employing a pump unit system of the first or second aspect, the rotor shafts of the first rotor and the second rotor are supported in a center-crank-like fashion with respect to the pump portion casing.

According to the present invention, which has the above-mentioned features, the rotor shaft exhibits a center-crank-like structure, whereby it is possible to stabilize the rotation of the rotor. Further, there is no need to set the shaft length large as in the case of the cantilever-like structure, making it possible to reduce the size of the pump portion.

According to a fourth aspect of the present invention, in the servo type volumetric flowmeter employing a pump unit system of any one of the first through third aspects, the pump portion casing is equipped with three separable plates composed of a middle plate having a measuring chamber forming portion extending therethrough in conformity with the configuration of the measuring chamber, a cover member side plate having a flat surface covering one opening of the measuring chamber forming portion, and a replaceable rotor shaft extension side plate having a flat surface covering the other opening of the measuring chamber forming portion or a recess constituting a part of the measuring chamber, and a plurality of screws for fixing to each other the three plates stacked together, and the pump portion casing when the three plates are stacked together has a fixed thickness and is detachable with respect to the unit accommodating recess.

According to the present invention, which has the above-mentioned features, there is provided a pump unit of a structure in which the ease of replacement at the time of flow rate range change is also taken into consideration.

According to a fifth aspect of the present invention, in the servo type volumetric flowmeter employing a pump unit system of any one of the first through fourth aspects, the main body casing has a pair of differential pressure detection pressure guide paths each of which has at one end thereof a differential pressure extraction port for differential pressure detection and a differential pressure detecting portion continuous with the other ends of the pair of differential pressure detection pressure guide paths, and the differential pressure detecting means is integrated with the main body casing at a position in a vicinity of the unit accommodating recess.

According to the present invention, which has the above-mentioned features, there is provided a servo type volumetric flowmeter of a structure in which the differential pressure detecting means is integrated with the main body casing and is close to the pump portion. Thus, apart from the features of the invention according to the first through fourth aspects thereof, it is also possible to enhance the accuracy in differential pressure detection.

According to a sixth aspect of the present invention, in the servo type volumetric flowmeter employing a pump unit system of the fifth aspect, the differential pressure extraction port is formed in the inflow port and the outflow port opening in the unit accommodating recess.

According to the present invention, which has the above-mentioned feature, there is provided a structure in which the position where differential pressure is detected is closer to the pump portion, making it possible to further enhance the accuracy in differential pressure detection.

According to the present invention, it is possible to provide a servo type volumetric flowmeter which is not only of high accuracy but also helps to achieve a reduction in the size of the pump portion and to facilitate the replacement of the pump portion.

BEST MODE FOR CARRYING OUT THE INVENTION

Figure 1:
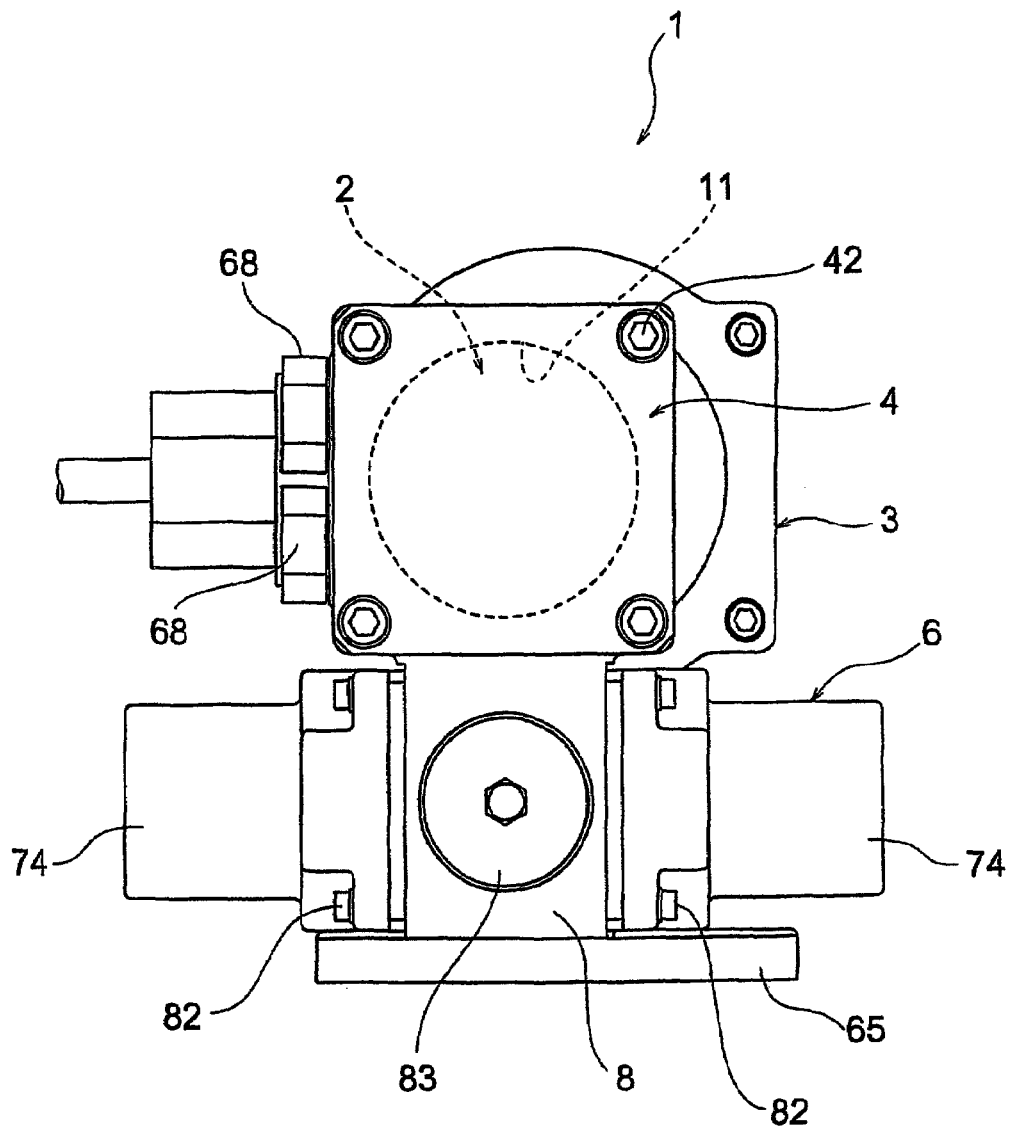
FIG. 1 is a front view of a servo type volumetric flowmeter employing a pump unit system according to an embodiment of the present invention.
Figure 2:
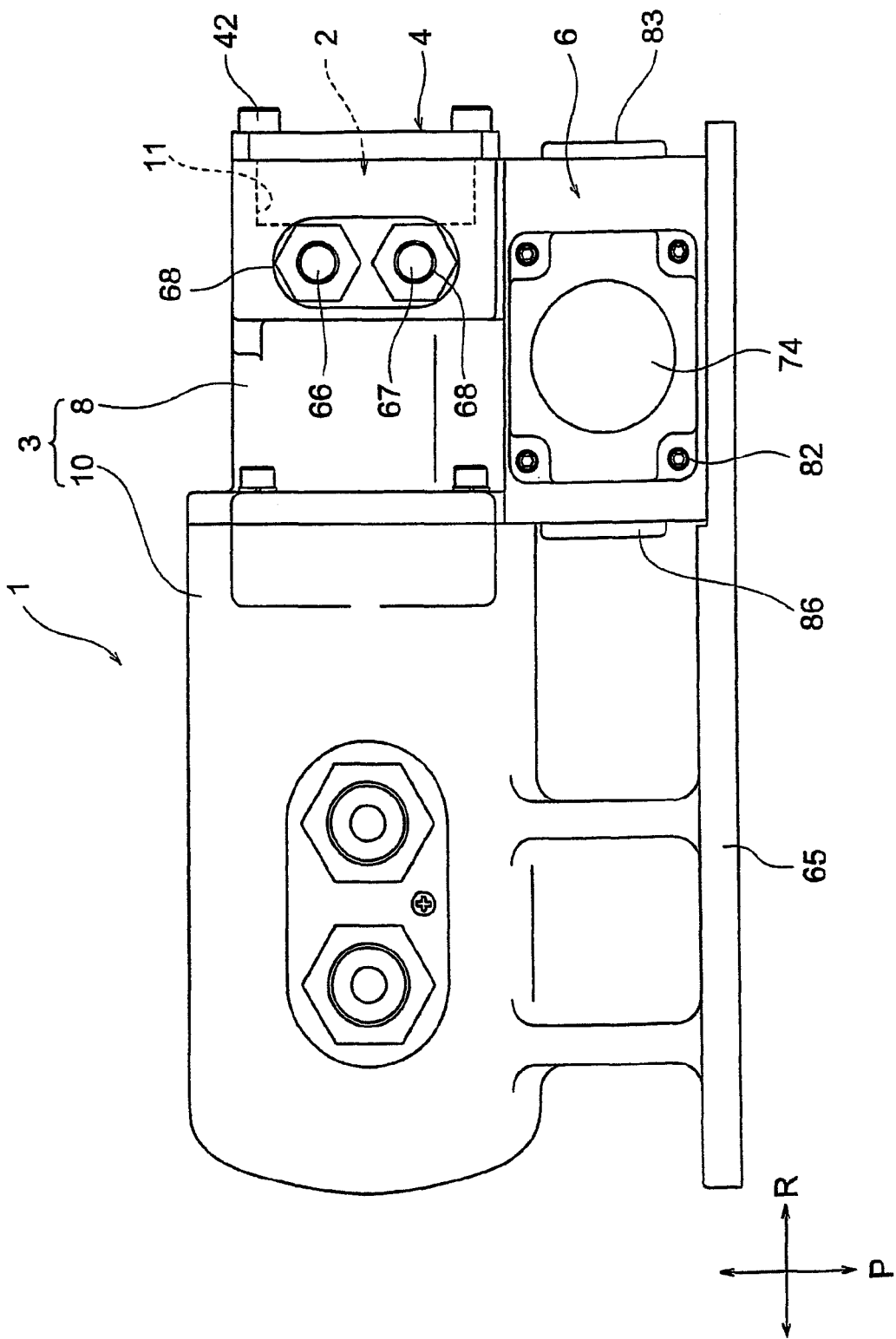
FIG. 2 is a left-hand side view of the servo type volumetric flowmeter employing a pump unit system.
Figure 3:
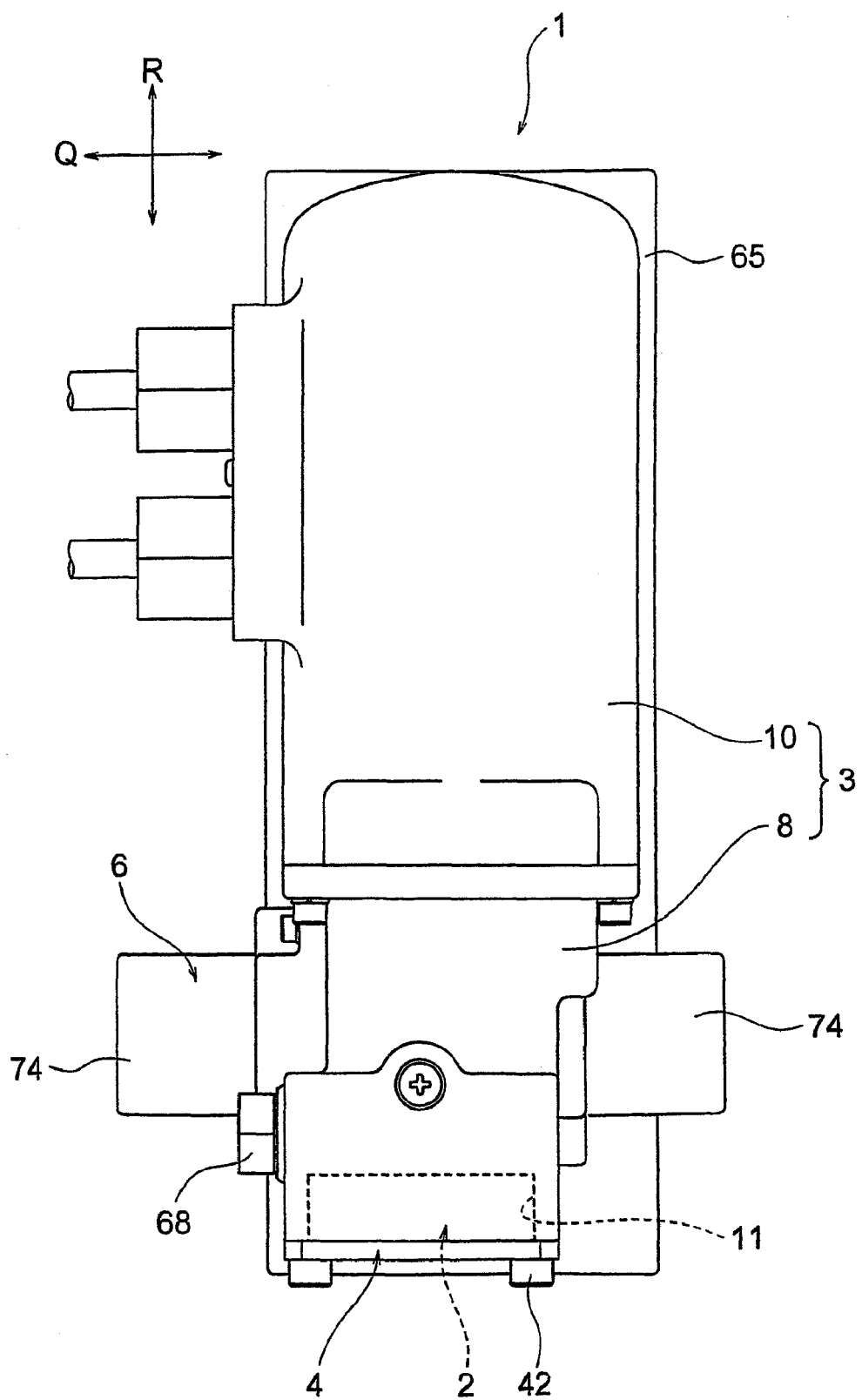
FIG. 3 is a plan view of the servo type volumetric flowmeter employing a pump unit system.
Figure 4:
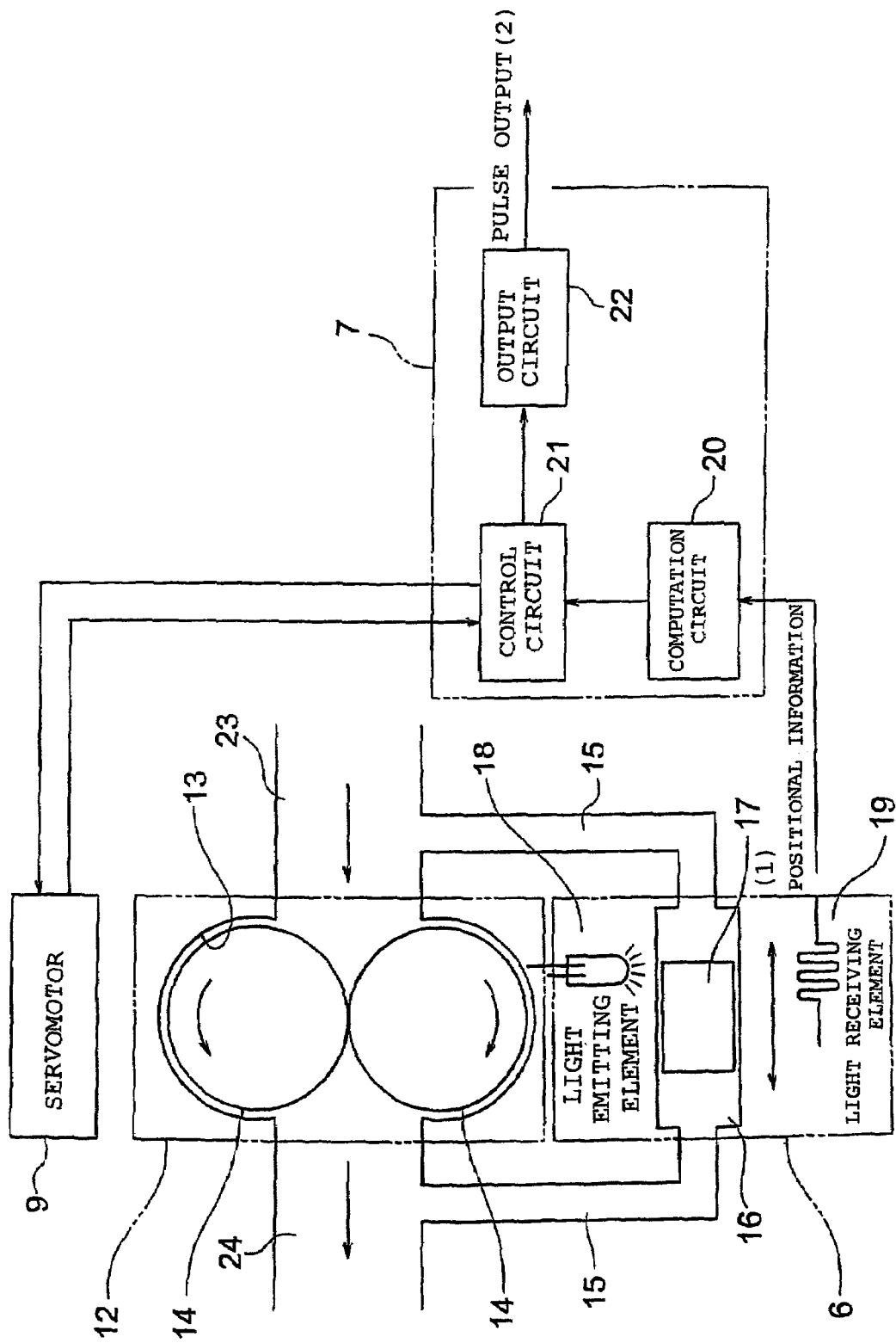
FIG. 4 is a diagram showing a system configuration.
Figure 5:
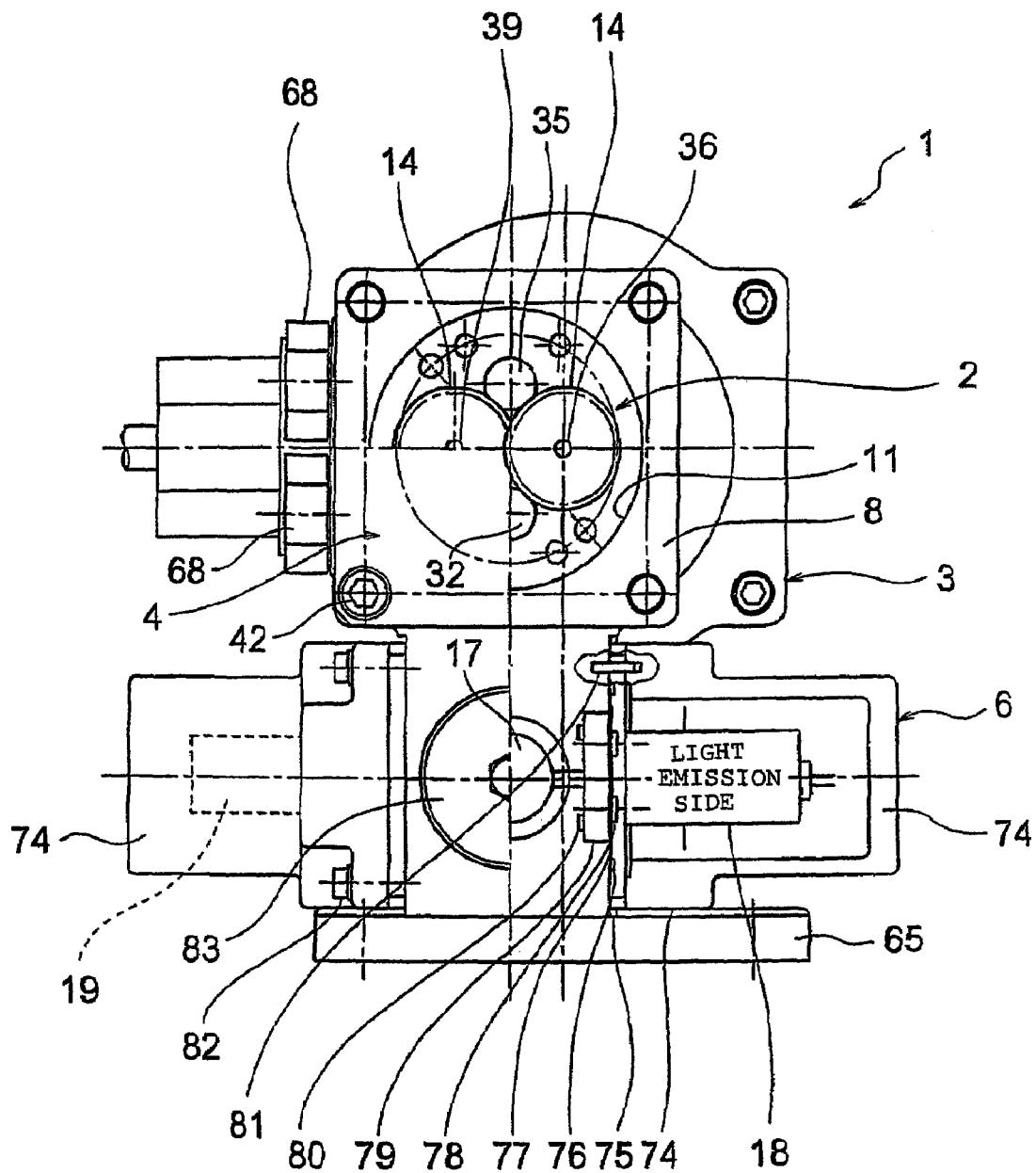
FIG. 5 is an explanatory structural view as seen from the front side.
Figure 6:
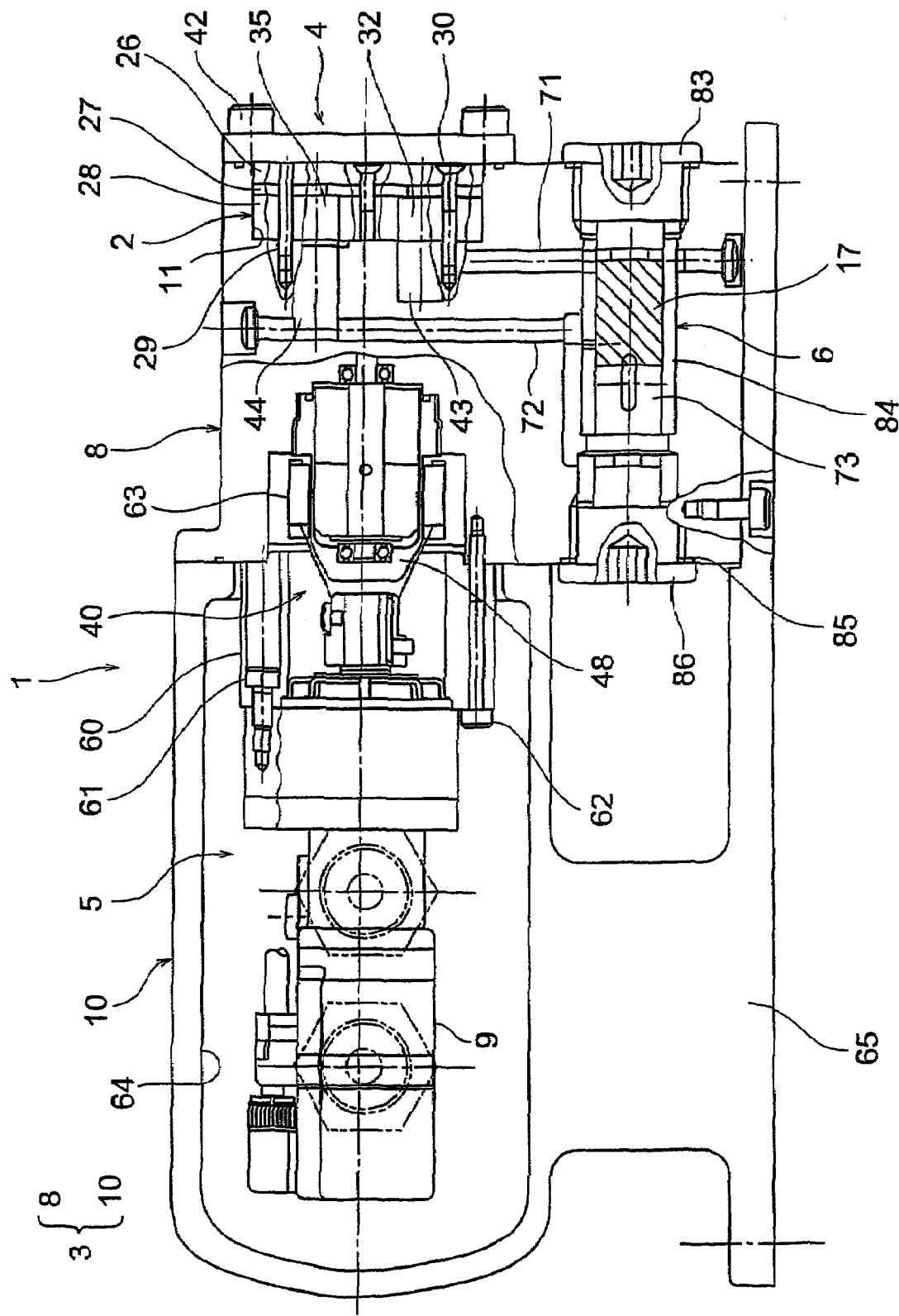
FIG. 6 is an explanatory structural view as seen from the left-hand side.
Figure 7:
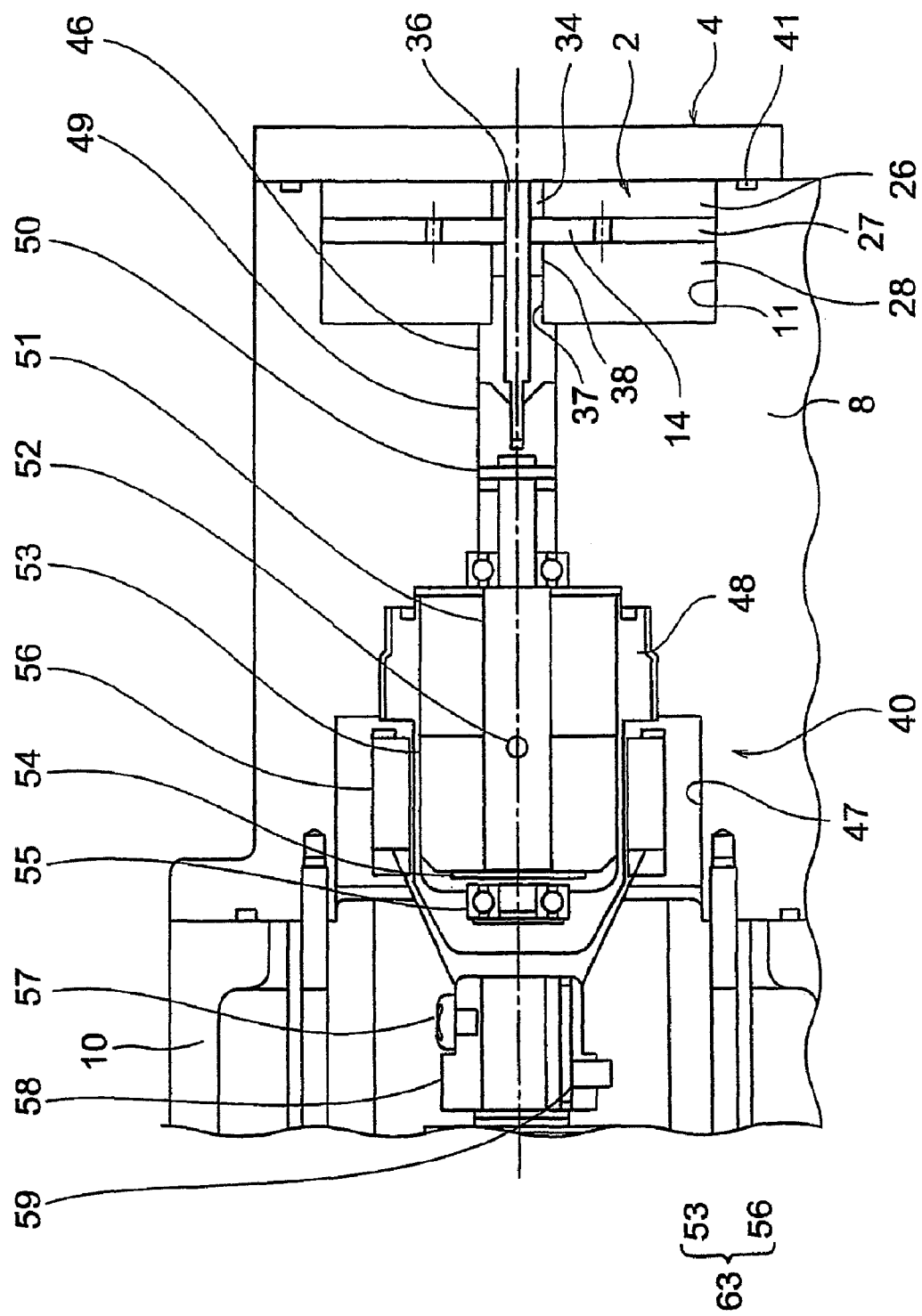
FIG. 7 is an explanatory structural view as seen at a drive position.
Figure 8:
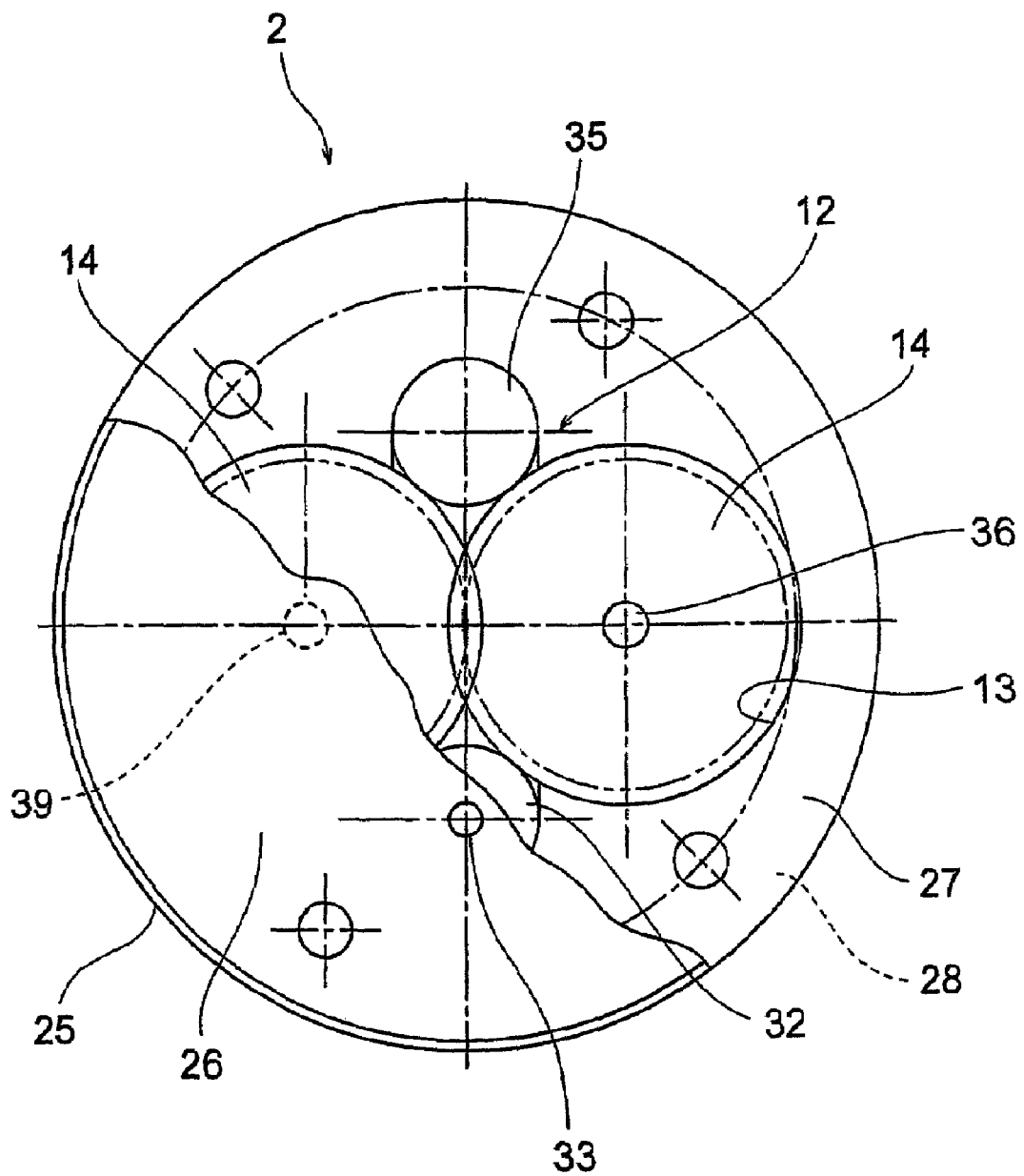
FIG. 8 is an explanatory structural view of a pump unit.
Figure 9:
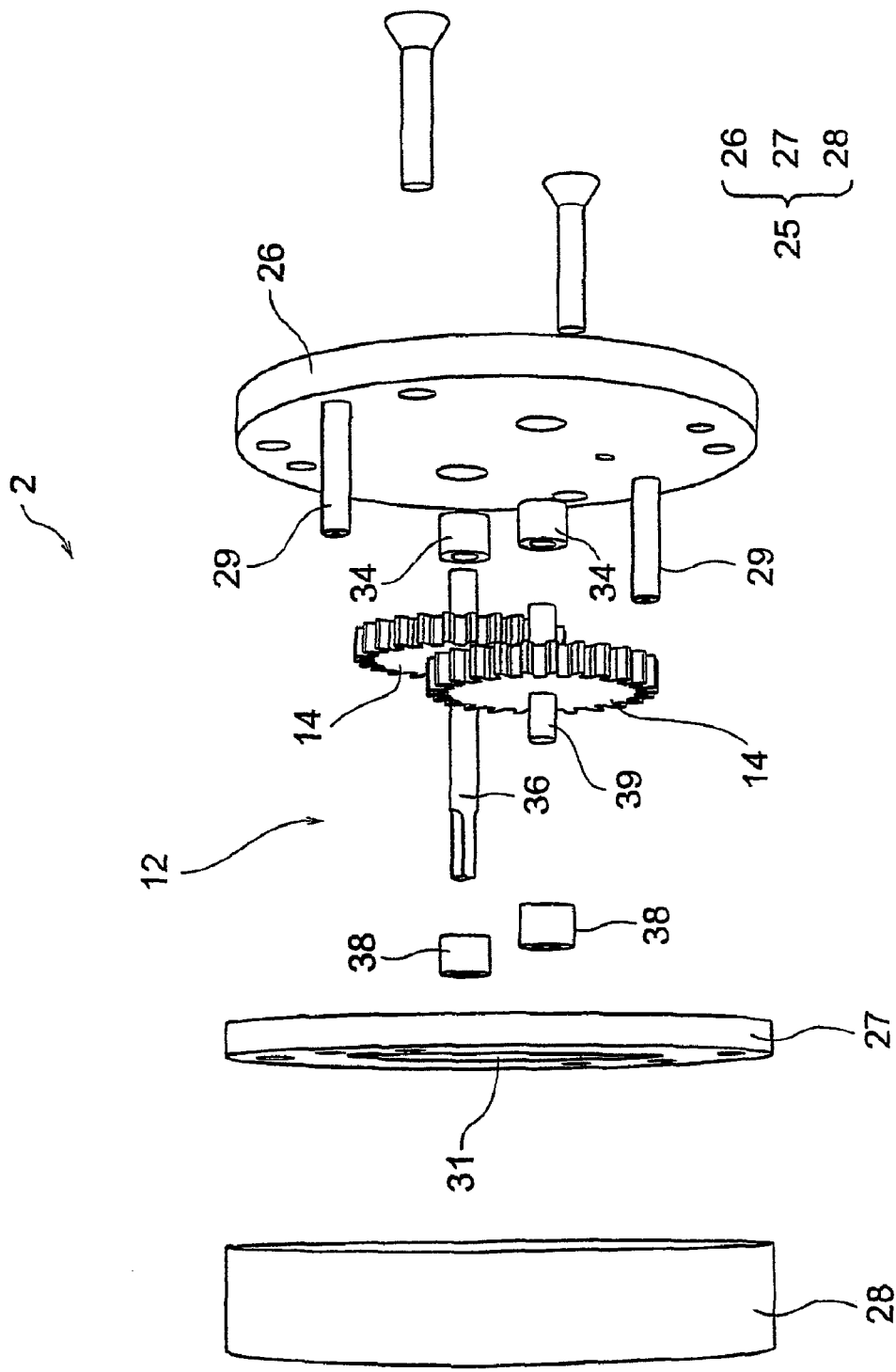
FIG. 9 is an exploded perspective view of the pump unit.
Figure 10:
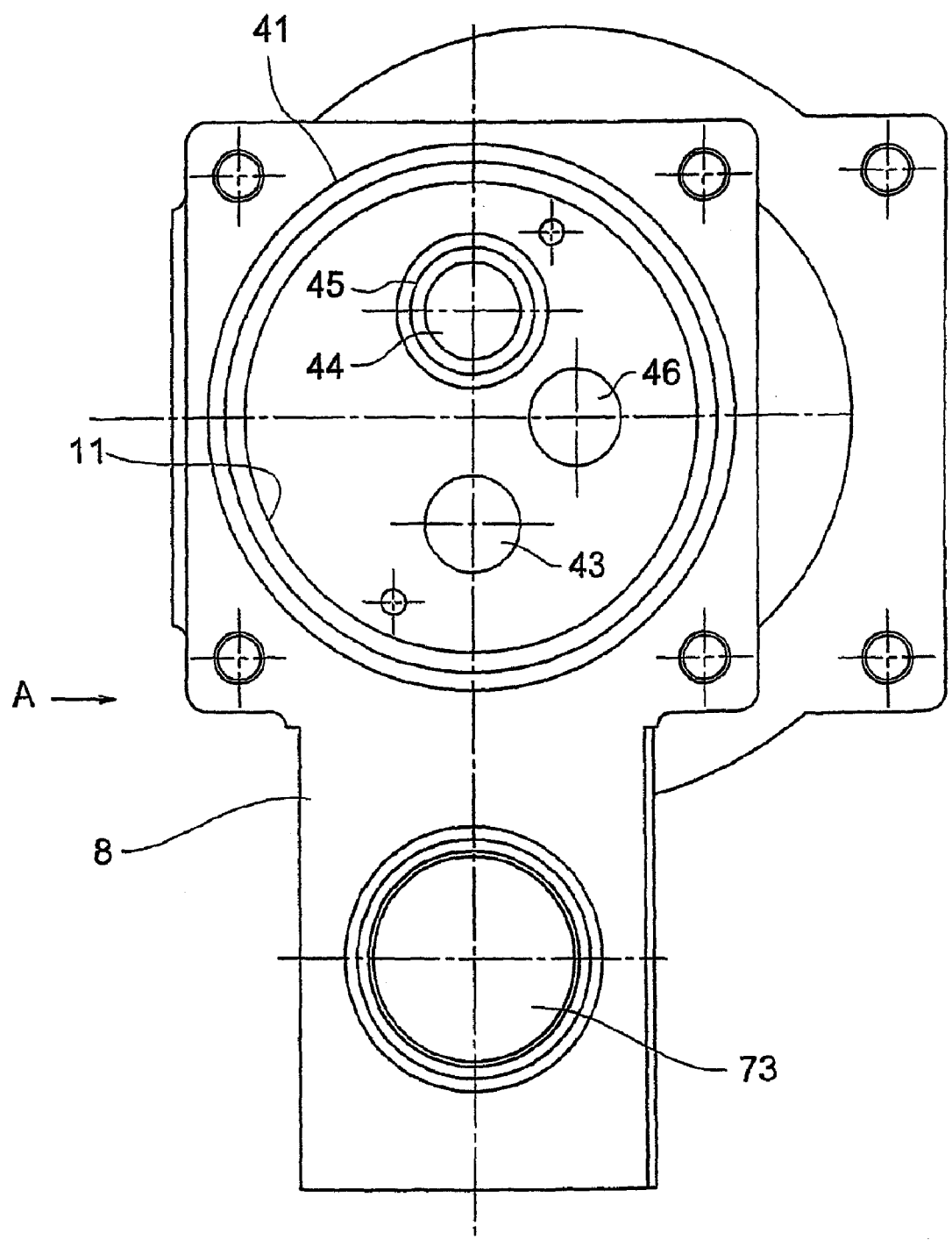
FIG. 10 is a front view of a front side main body casing integrated with a main body casing.
Figure 11:
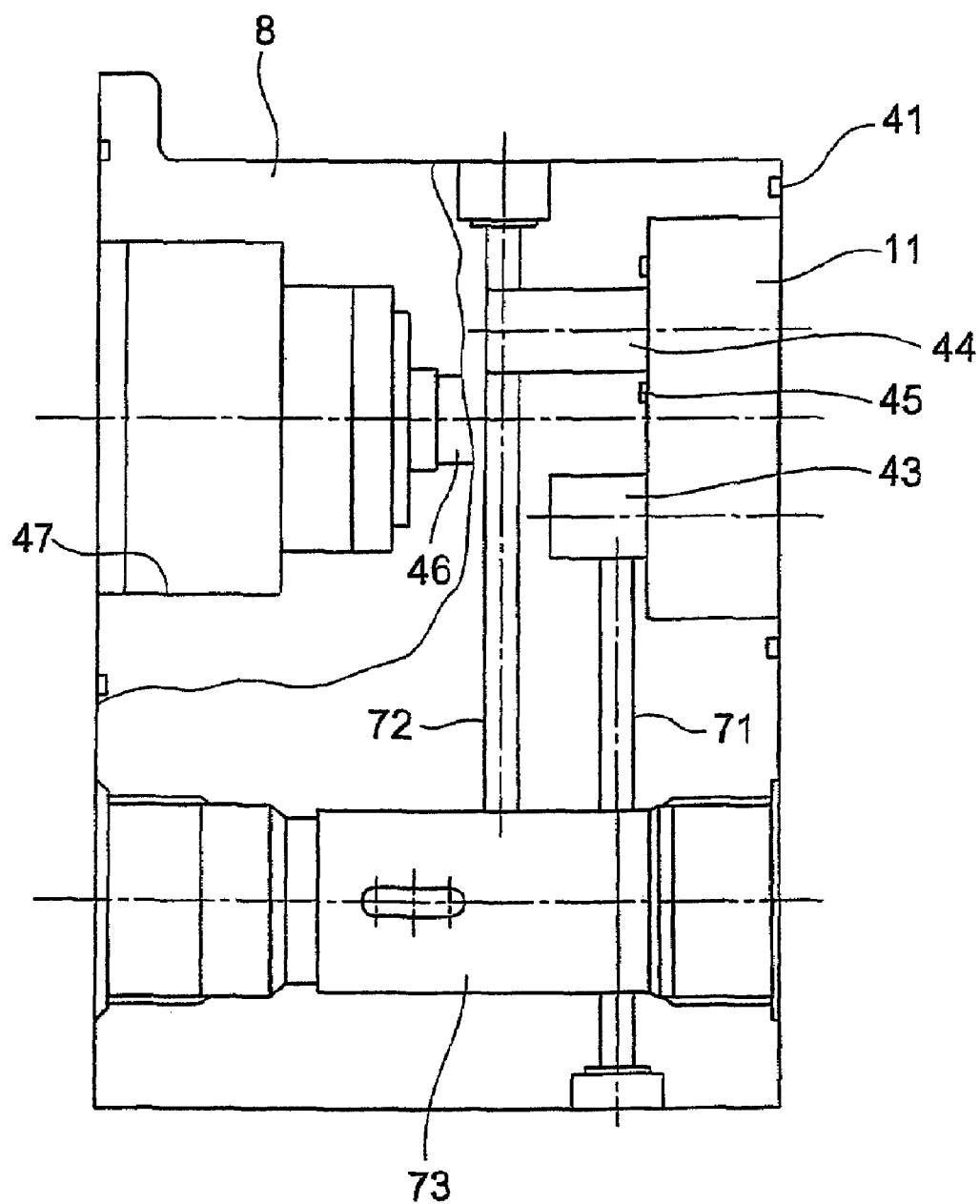
FIG. 11 is a sectional view of the front side main body casing.
Figure 12:
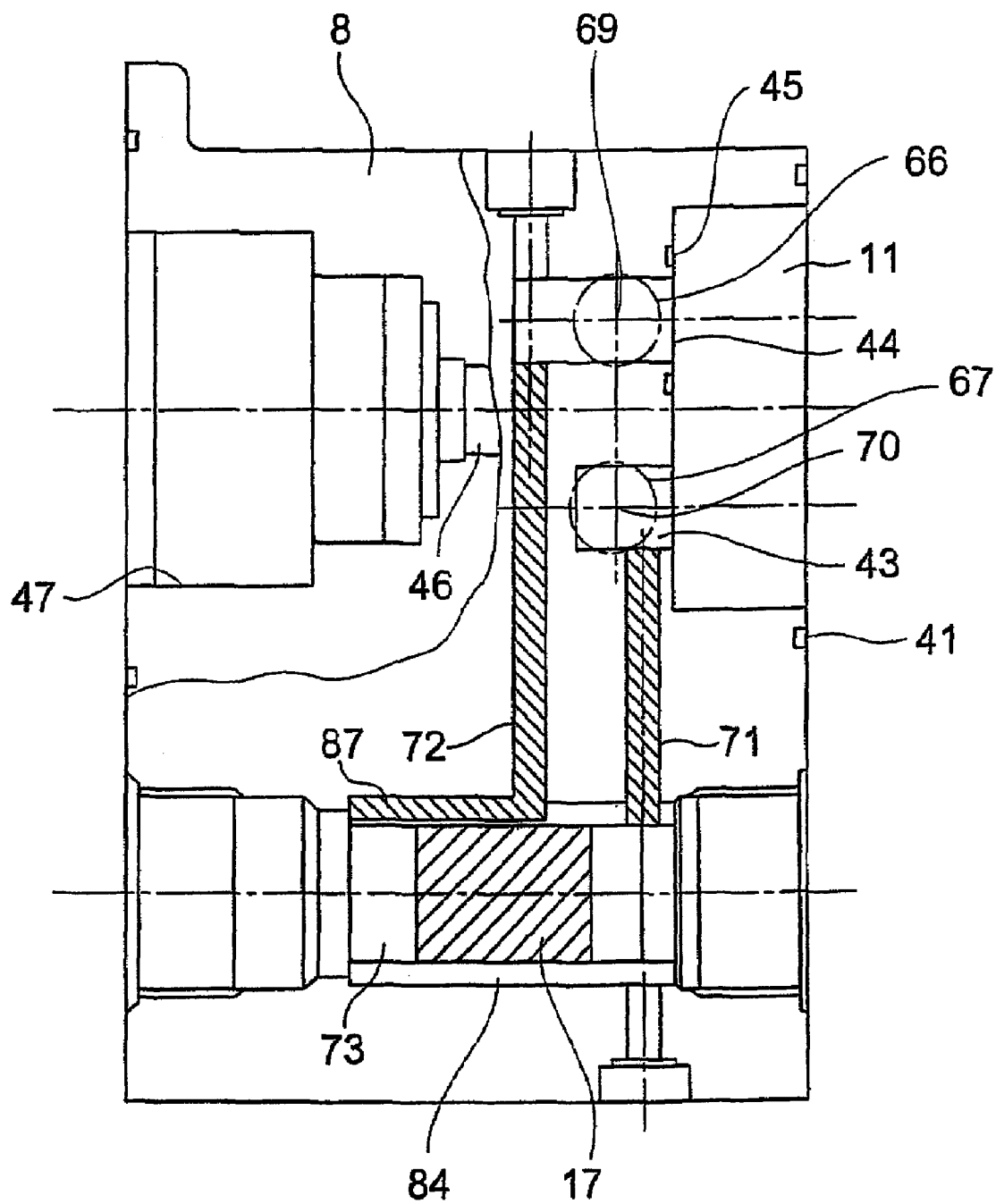
FIG. 12 is a sectional view of the front side main body casing with a pressure guide path formed therein.
Figure 13:
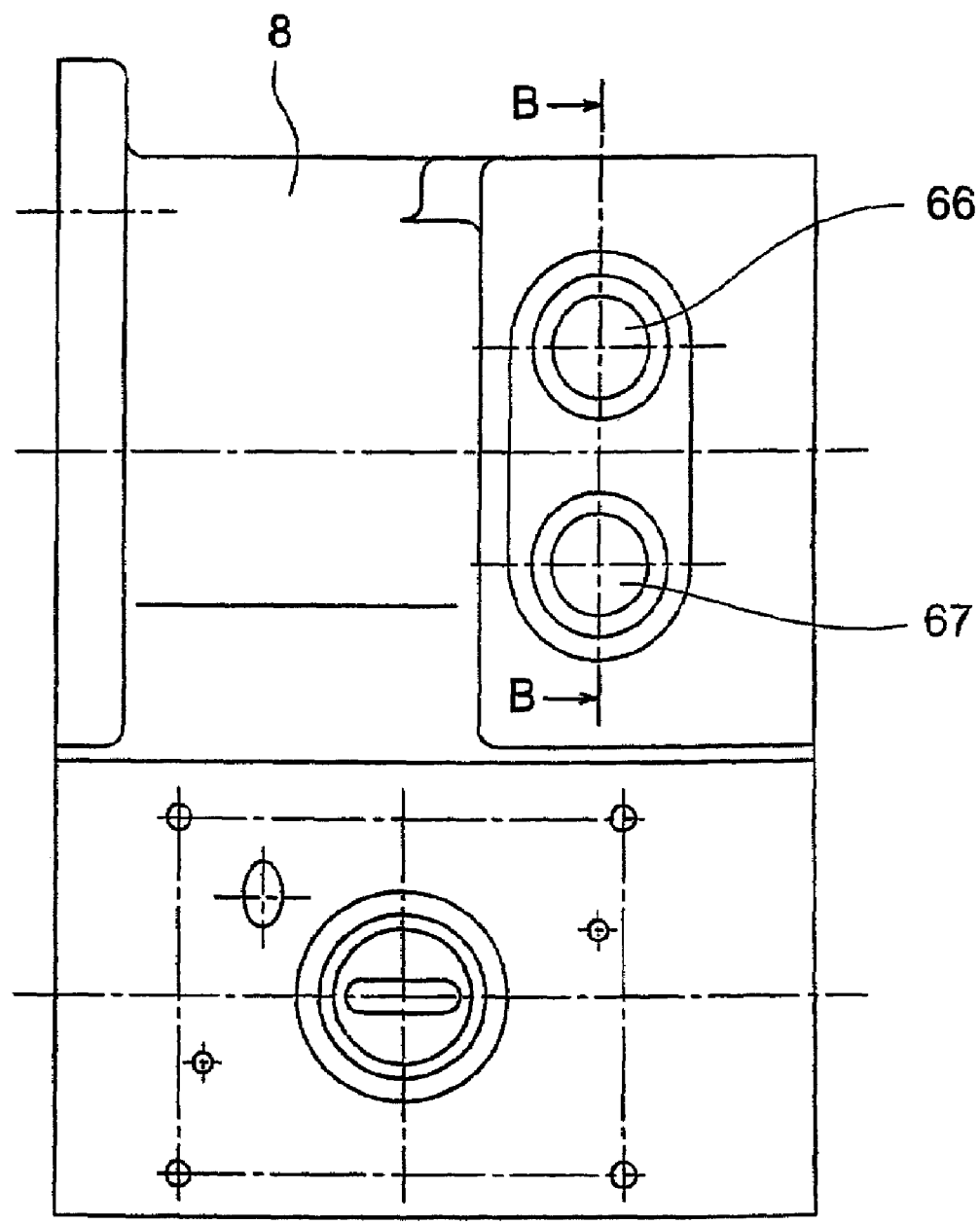
FIG. 13 is a view as seen in the direction of the arrow A in FIG. 10.
Figure 14:
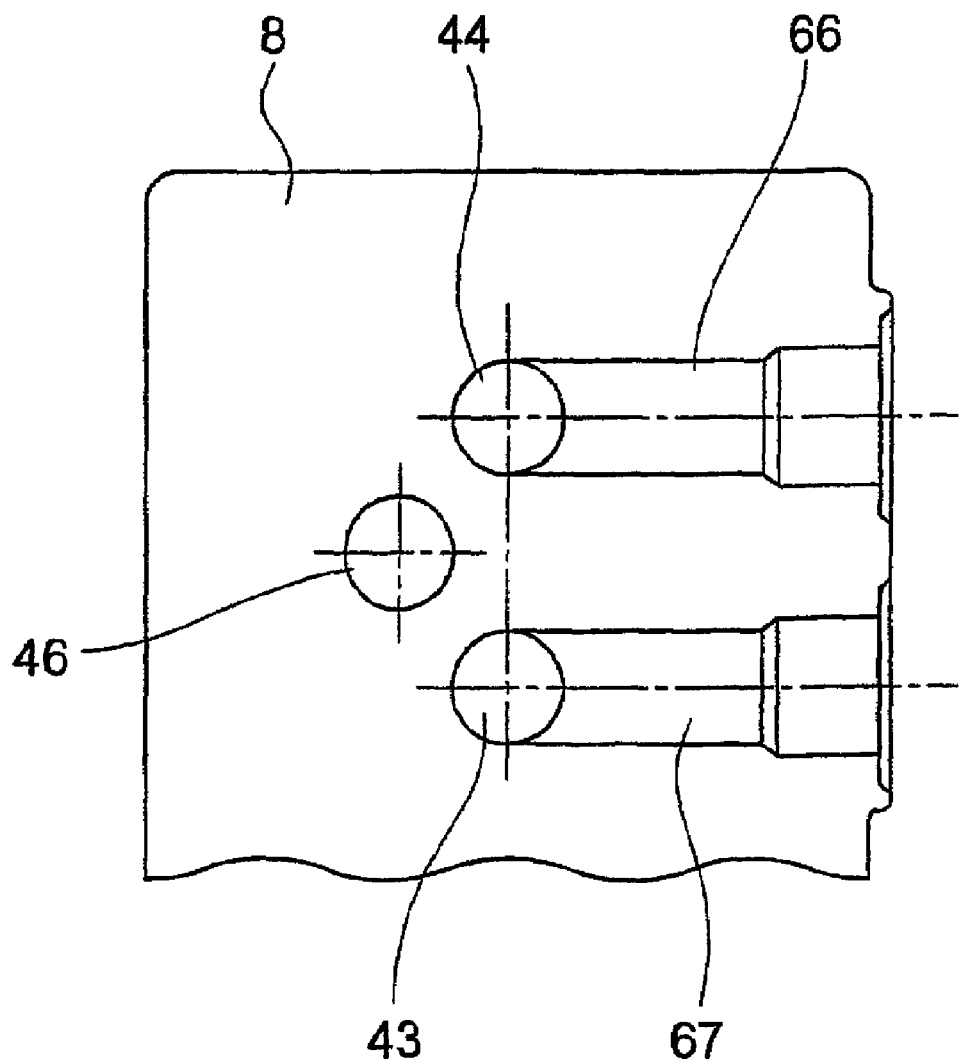
FIG. 14 is a sectional view taken along the line B-B of FIG. 13.
Figure 15:
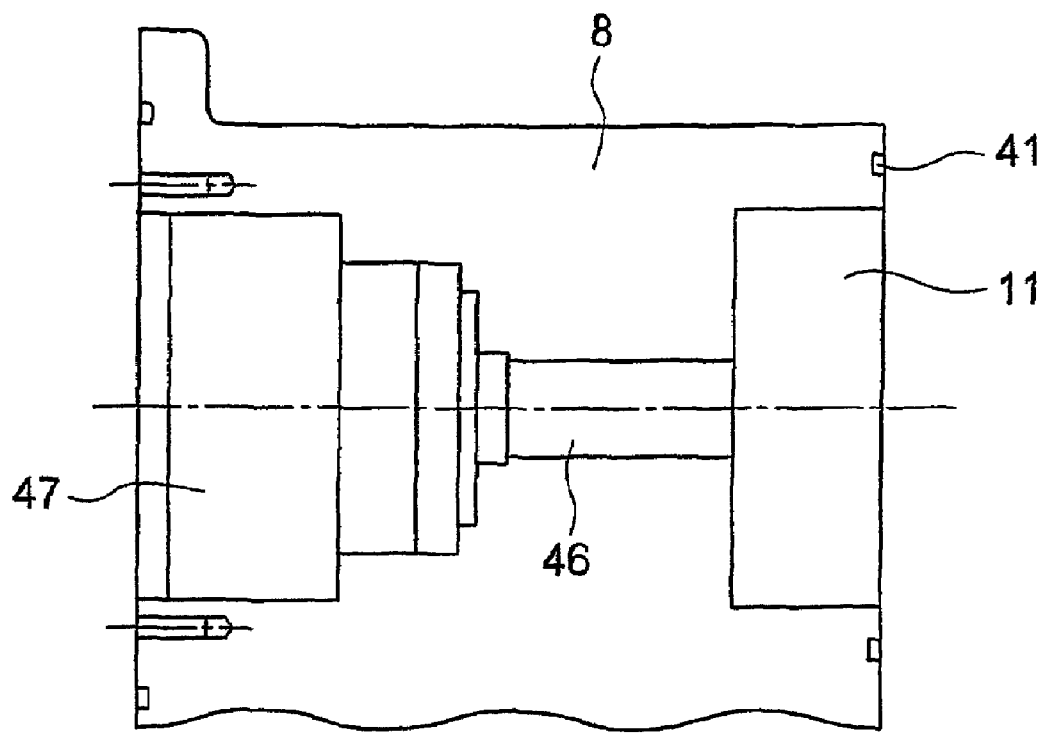
FIG. 15 is a sectional view of the front side main body casing at the drive position.

In the following, the present invention will be described with reference to the drawings. FIG. 1 is a front view of a servo type volumetric flowmeter employing a pump unit system according to an embodiment of the present invention. FIG. 2 is a left-hand side view of the servo type volumetric flowmeter employing a pump unit system, FIG. 3 is a plan view of the servo type volumetric flowmeter employing a pump unit system, FIG. 4 is a diagram showing a system configuration, FIG. 5 is an explanatory structural view as seen from the front side, FIG. 6 is an explanatory structural view as seen from the left-hand side, FIG. 7 is an explanatory structural view as seen at a drive position, FIG. 8 is an explanatory structural view of a pump unit, FIG. 9 is an exploded perspective view of the pump unit, FIG. 10 is a front view of a front side main body casing integrated with a main body casing, FIG. 11 is a sectional view of the front side main body casing, FIG. 12 is a sectional view of the front side main body casing with a pressure guide path formed therein, FIG. 13 is a view as seen in the direction of the arrow A in FIG. 10, FIG. 14 is a sectional view taken along the line B-B of FIG. 13, and FIG. 15 is a sectional view of the front side main body casing at the drive position. In the drawings, the portions that cannot be shown by a simple sectional view are illustrated in a "cutaway" fashion. Regarding the portions shown in "cutaway" illustration, a deviation from strictly accurate positions is involved. Regarding throughout the drawings, the reason for not shading the sections is to avoid difficulty in showing details.

In FIGS. 1 through 3, reference numeral 1 indicates a servo type volumetric flowmeter employing a pump unit system according to the present invention (hereinafter referred to simply as volumetric flowmeter 1). The volumetric flowmeter 1 is equipped with a pump unit 2, which is detachable. Further, the volumetric flowmeter 1 has a route structure related to fluid flow and differential pressure detection suitable, in particular, for the case in which the pump unit 2 is provided.

The construction of the volumetric flowmeter 1 will be described more specifically. The volumetric flowmeter 1 is equipped with the pump unit 2 as well as a main body casing 3 for accommodating the pump unit 2 and a cover member 4. Further, as shown in from FIG. 4 onward, the volumetric flowmeter 1 is further equipped with a shaft driving means 5, a differential pressure detecting means 6, and a control means 7.

Here, the arrows of FIGS. 1 through 3 will be illustrated. The arrow P indicates the vertical direction. The arrow Q indicates the horizontal direction, and the arrow R indicates the longitudinal direction. Those directions may or may not coincide with the direction in which the volumetric flowmeter 1 is mounted. (It should be noted, however, that a mounting direction in which piston 17 described below is set vertically is not permissible.)

In FIG. 6, the main body casing 3 is equipped with a front side main body casing 8 having a structure which accommodates the pump unit 2 and integrates the differential pressure detecting means 6, and a rear side main body casing 10 which is connected to the front side main body casing 8 and in which it is possible to mount a servomotor 9 constituting the main body of the shaft driving means 5.

In the front surface of the front side main body casing 8, there is formed a unit accommodating recess 11 for accommodating the pump unit 2. The pump unit 2 is inserted into the unit accommodating recess 11, and is then covered with the cover member 4 to be thereby completely accommodated. By removing the cover member 4, the volumetric flowmeter 1 allows maintenance, replacement or the like of the pump unit 2.

First, the system configuration will be briefly illustrated with reference to FIG. 4. After that, the components will be described with reference to FIGS. 1 through 15.

In FIG. 4, reference numeral 12 indicates a pump portion. The pump portion 12 has a measuring chamber 13 and a pair of rotors 14. The pair of rotors 14 are arranged so as to be engaged with each other, and one of them is driven by the servomotor 9. The differential pressure detecting means 6 has a pair of differential pressure detection pressure guide paths 15 and a differential pressure detecting portion 16. Further, in this case, it has a piston 17, a light emission side photoelectric sensor (light emitting element) 18, and a light reception side photoelectric sensor (light receiving element) 19. The control means 7 has a computation circuit 20, a control circuit 21, and an output circuit 22.

In the above-mentioned construction, the fluid to be measured (which flows from the right to the left in the drawing) entering at an inlet 23 reaches an outlet 24 by way of the pair of rotors 14 of the pump portion 12. On the output side and the input side of the pair of rotors 14 (i.e., on the left-hand side and the right-hand side in FIG. 4), there are provided the pair of differential pressure detection pressure guide paths 15; when a differential pressure is generated, the piston 17 accommodated in the differential pressure detecting portion 16 moves to the right or left. This movement of the piston 17 is observed by the light emission side photoelectric sensor 18 and the light reception side photoelectric sensor 19, and positional information on the piston 17 is transmitted to the computation circuit 20.

In the computation circuit 20, there is generated a signal to be transmitted to the control circuit 21 so as to keep the differential pressure at zero, in other words, so as to stop the piston 17. The control circuit 21 is adapted to drive the servomotor 9 based on the signal from the computation circuit 20. Transmitted to the control circuit 21 is an encoder signal fed back from the servomotor 9. This encoder signal is transmitted to the output circuit 22, which outputs the encoder signal to the exterior as a flow rate signal (pulse output).

The components of the volumetric flowmeter 1 will be described.

In the pump unit 2, the pump portion 12 is provided inside a pump portion casing 25 (see, for example, FIGS. 8 and 9). The pump portion casing 25 is substantially formed as a cylinder whose thickness in the longitudinal direction is relatively small. In this embodiment, the ease of replacement at the time of flow rate range change is also taken into consideration, so the above-mentioned thickness is set to a fixed level. The substantially cylindrical configuration is given only by way of example. (There are no particular limitations regarding its configuration as long as the formation of pump portion 12 is possible and the attachment/detachment with respect to unit accommodating recess 11 (see FIG. 6) is easy to perform.)

In FIG. 9, the pump portion casing 25 has three circular plates that are separable from each other. In order to give their names from the front side, they are: a cover member side plate 26, a middle plate 27, and a rotor shaft extension side plate 28. Those three plates are stacked together and fixed to each other by a plurality of screws (not indicated by reference numerals).

The pump portion casing 25, constructed as described above, has rearwardly extending positioning pins 29 (the setting of which may be conducted arbitrarily). The positioning pins 29 are provided in order to allow smooth mating when inserting the pump unit 2 into the unit accommodating recess 11 (see FIG. 6) for accommodation.

After positioning thereof at the unit accommodating recess 11, the pump unit 2 is fixed in position by mounting screws 30 passed through the pump portion casing 25 (see FIG. 6).

The main portions of the three plates will be illustrated. The middle plate 27 has a measuring chamber forming portion 31 formed so as to extend therethrough (from the front side to the rear side) in conformity with the configuration of the measuring chamber 13 (see FIG. 8). The middle plate 27 of this embodiment is set to a thickness slightly larger than the thickness of the rotors 14.

The cover member side plate 26 has a flat surface (rear surface) cover the front side opening of the measuring chamber forming portion 31. In the cover member side plate 26, there is formed a pressure guide port 33 (see FIG. 8) extending therethrough so as to be matched with the position of a fluid inflow port 32 described below. The pressure guide port 33 is formed in order to guide a portion of the fluid to be measured entering at the fluid inflow port 32 to the unit accommodating recess 11 (see FIG. 6). On the rear surface of the cover member side plate 26, there are provided two bearings 34 so as to be arranged horizontally side by side at a predetermined interval.

The rotor shaft extension side plate 28 has a flat surface (front surface) covering the rear side opening of the measuring chamber forming portion 31. (When changing the flow rate range, it is possible to recess the front surface to form a part of the measuring chamber forming portion 31. In this case, several types of rotor shaft extension side plate 28 are prepared as replacement components.)

The fluid inflow port 32 and a fluid outflow port 35 which communicate with the measuring chamber forming portion 31, in other words, with the measuring chamber 13, are formed in the rotor shaft extension side plate 28 so as extend therethrough. Further, also extending through the rotor shaft extension side plate 28 is a drive shaft through-hole 37 corresponding to a rearwardly extending rotor shaft 36 described below.

On the front surface of the rotor shaft extension side plate 28, there are provided two bearings 38 so as to be arranged horizontally side by side at a predetermined interval. One of the bearings 38 is provided in the drive shaft through-hole 37 (see FIG. 7). The rotor shaft 36 and a rotor shaft 39 of the rotors 14 are rotatably supported in a center-crank-like fashion by the bearings 38 of the rotor shaft extension side plate 28 and the bearings 34 of the cover member side plate 26.

In FIG. 8, the pump portion 12 has the measuring chamber 13, the pair of rotors 14, and the rotor shafts 36, 39. The pair of rotors 14 are arranged so as to be engaged with each other, and the rotor shaft 36, which is provided on one of the rotors 14 constitutes the drive shaft and extends (rearwards) to the exterior through the drive shaft through-hole 37 (see FIG. 7). The fluid inflow port 32 and the fluid outflow port 35 are formed to be arranged respectively below and above the engagement portion between the pair of rotors 14. In FIG. 8, the fluid inflow port 32 is on the lower side, and the fluid outflow port 35 is on the upper side. The fluid inflow port 32 and the fluid outflow port 35 are formed so as to be arranged as close as possible to the engagement portion.

The drive shaft through-hole 37 (see FIG. 7) is formed and arranged in conformity with position of the servomotor 9 (see FIG. 6). In this embodiment, the drive shaft through-hole 37 is formed and arranged so that the center thereof is positioned on the center axis of the main body casing 3 (see FIG. 6).

In FIGS. 5, 6, the front side main body casing 8 constituting the main body casing 3 has in the front surface thereof the unit accommodating recess 11 for accommodating the pump unit 2. Further, the front side main body casing 8 has in the left-hand side surface thereof a route portion related to the flow of the fluid to be measured. The route portion related to the flow of the fluid to be measured is formed so as to communicated with the unit accommodating recess 11. Further, the front side main body casing 8 has there below a portion for integrating the differential pressure detecting portion 6 therewith. This portion is formed such that the route related to differential pressure detection is continuous with the vicinity of the unit accommodating recess 11. Further, the front side main body casing 8 has on the rear surface thereof a connecting portion for the rear side front body casing 10 and a portion related to a drive force transmitting portion 40 (see FIG. 7). The portion related to the drive force transmitting portion 40 is formed so as to be continuous with the unit accommodating recess 11.

The unit accommodating recess 11 is formed in the front surface of the front side main body casing 8 so as to be a circular recess. On the outer side of the opening edge portion of the unit accommodating recess 11, there is mounted an O-ring 41. To the front side of the front side main body casing 8, there is mounted the cover member 4 so as to cover the opening of the unit accommodating recess 11. The mounting of the cover member 4 is effected by fastening four bolts 42.

In the state in which the cover member 4 has been mounted, the front side main body casing 8 (unit accommodating recess 11) has the function as a pressure container. That is, in the volumetric flowmeter 1, the pump unit 2 itself does not need to have the function of a pressure container. The reason for causing the above-mentioned components to function as a pressure container is to cause a portion of the fluid to be measured to flow into the unit accommodating recess 11 through the pressure guide port 33 (see FIG. 8), bringing also the outer side portion of the pump unit 2 into a wet state with the fluid filling the same. (The fluid pressures applied to the inner and outer sides of the pump unit 2 are equalized.)

At the depth (bottom) of the unit accommodating recess 11, there are formed a first inflow path 43 and a first outflow path 44 so as to be matched with the positions of the fluid inflow port 32 and the fluid outflow port 35, respectively. The first inflow path 43 and the first outflow path 44 are formed as route portions related to the flow of the fluid to be measured. The first inflow path 43 is formed and arranged to be on the lower side, and the first outflow path 44 is formed and arranged to be on the upper side. An O-ring 45 is mounted to the periphery of the opening edge portion of the first outflow path 44 (see FIG. 10). The route portions related to the flow of the fluid to be measured will be described in detail below.

Further, at the depth (bottom) of the unit accommodating recess 11, there is formed a rotor shaft through-hole 46 so as to be matched with the position of the rotor shaft 36 extending from the pump unit 2 (see FIG. 15). The rotor shaft through-hole 46 is formed so as to be continuous with a pressure spacer mounting recess 47 open in the rear surface of the front side main body casing 8 (see FIG. 7). In FIG. 7, in the pressure spacer mounting recess 47, there is provided a pressure spacer 48 in a liquid-tight state (state in which the fluid to be measured is shut off). The unit accommodating recess 11 side and the servomotor 9 side are spaced apart from each other by the pressure spacer 48 (see FIG. 6). The rotor shaft through-hole 46, the pressure spacer mounting recess 47, and the pressure spacer 48 constitute the portion related to the drive force transmitting portion 40.

Here, with reference to FIGS. 6 and 7, the components of the portion related to the drive force transmitting portion 40, etc. will be named. (First, regarding the construction of front side main body casing 8, the components will be named successively starting from unit accommodating recess 11 side, and then the components on servomotor 9 side will be named.) A specific description of their operation, etc. will be omitted.

Reference numeral 49 indicates a shaft coupling. Reference numeral 50 indicates a shaft coupling detent pin. Reference numeral 51 indicates a driven magnet shaft. Reference numeral 52 indicates a driven magnet detent pin. Reference numeral 53 indicates a driven magnet. Reference numeral 54 indicates an E-ring. Reference numeral 55 indicates a ball bearing.

Reference numeral 56 indicates a driving magnet portion. Reference numeral 57 indicates a driving magnet mounting screw. Reference numeral 58 indicates a motor adapter. Reference numeral 59 indicates a motor adapter screw. Reference numeral 60 indicates motor mounting hardware. Reference numeral 61 indicates a reduction gear mounting bolt. Reference numeral 62 indicates a motor portion mounting bolt.

As can be seen from the construction of the portion related to the drive force transmitting portion 40, in this embodiment, the rotor shaft 36 extending from the pump unit 2 is driven by a magnetic coupling 63 formed by the driving magnet portion 56 and the driven magnet 53. In this embodiment, there is adopted a method by which the rotor shaft 36 is driven by using the magnetic coupling 63, so not only is there no fear of liquid leakage, but it is also possible to smoothly rotate the rotor shaft 36.

The servomotor 9 existing at the rear of the portion related to the drive force transmitting portion 40 is mounted so as to be accommodated in a main body mounting portion 64 formed inside the rear side main body casing 10. The rear side main body casing 10 in which the main body mounting portion 64 is formed has an installation base 65 for installing the volumetric flowmeter 1 at a predetermined position, and extends to the portion for integrating the differential pressure detecting means 6 formed below the front side main body casing 8, making it possible to fix the differential pressure detecting means 6 in position.

The route portion related to the flow of the fluid to be measured and the route portion related to the differential pressure detection will be described mainly with reference to FIGS. 10 through 14. First, the route portion related to the flow of the fluid to be measured will be described.

The first outflow path 44 on the upper side is formed such that one end thereof is continuous with the fluid outflow port 35 of the pump unit 2. The first outflow path 44 is formed so as to extend straight rearwards from the depth (bottom) of the unit accommodating recess 11, that is, so as to extend parallel to the axial direction of the rotor shaft 36 extending from the pump unit 2. In order to achieve a reduction in the longitudinal dimension of the volumetric flowmeter 1, the length of the first outflow path 44 is set minimum. In this embodiment, the length is set such that the position of the other end of the first outflow path 44 is on the front side of the central position in the longitudinal direction of the front side main body casing 8.

A first inflow path 43 on the lower side is formed such that one end thereof is continuous with the fluid inflow port 32 of the pump unit 2. The first inflow path 43 is formed so as to extend straight rearwards from the depth (bottom) of the unit accommodating recess 11, that is, so as to extend parallel to the axial direction of the rotor shaft 36 extending from the pump unit 2. Further, the first inflow path 43 is formed so as to be parallel to the first outflow path 44 on the upper side. The first inflow path 43 is formed so as to be somewhat shorter than the first outflow path 44 on the upper side.

The description of the first inflow path 43 and the first outflow path 44 will be summarized. The first inflow path 43 and the first outflow path 44 are open in the size of the fluid inflow port 32 and the flow outflow port 35, and are parallel to each other while maintaining a fixed distance therebetween. Further, the first outflow path 44 is formed so as to extend somewhat longer rearwards.

A second outflow path 66 is formed so as to be continuous with the first outflow path 44 on the upper side (see FIGS. 12, 14). The second outflow path 66 is formed so as to extend straight in a direction orthogonal to (to the left in this embodiment) with respect to the axial direction of the rotor shaft 36 extending from the pump unit 2. The second outflow path 66 is formed such that one end thereof is continuous with the first outflow path 44 and that the other end thereof is open in the left-hand side surface of the front side main body casing 8. The second outflow path 66 is formed so as to open in the same size as the first outflow path 44. The second outflow path 66 and the first outflow path 44 are formed as substantially L-shaped routes.

A second inflow path 67 is formed so as to be continuous with the first inflow path 43 on the lower side. The second inflow path 67 is formed so as to extend straight in a direction orthogonal to (to the left in this embodiment) with respect to the axial direction of the rotor shaft 36 extending from the pump unit 2. Further, the second inflow path 67 is formed so as to be parallel to the second outflow path 66. The second inflow path 67 is formed such that one end thereof is continuous with the first inflow path 43 and that the other end thereof is open in the left-hand side surface of the front side main body casing 8. The second inflow path 67 is formed so as to open in the same size as the first inflow path 43. The second inflow path 67 and the first inflow path 43 are formed as substantially L-shaped routes.

The description of the second inflow path 67 and the second outflow path 66 will be summarized. The second inflow path 67 and the second outflow path 66 are open in the size of the fluid inflow port 32 and the flow outflow port 35, respectively, and are parallel to each other while maintaining a fixed distance therebetween, extending in the same length to open in the left-hand surface of the front side main body casing 8.

The route portion related to the flow of the fluid to be measured is constituted by the substantially L-shaped route formed by the second outflow path 66 and the first outflow path 44 and the substantially L-shaped path formed by the second inflow path 67 and the first inflow path 43. A joint 68 is mounted to each of the opening portions of the second outflow path 66 and the second inflow path 67 in the left-hand side surface of the front side main body casing 8. In this embodiment, the first outflow path 44 corresponds to the opening end portion of the outflow path opening in the unit accommodating recess 11. Further, the first inflow path 43 corresponds to the inflow path opening in the unit accommodating recess 11.

In FIG. 12, a continuation center position 69 of the second outflow path 66 and the first outflow path 44 and a continuation center position 70 of the second inflow path 67 and the first inflow path 43 are set so as to be arranged vertically. In this embodiment, the continuation center position 70 is set in conformity with the other end position of the first inflow path 43. Thus, the first outflow path 44 has some space on the rear side of the continuation center position 69. This space is used for differential pressure detection. This is why the first outflow path 44 is set somewhat longer than the first inflow path 43.

Next, the route portion related to differential pressure detection will be described.

One differential pressure detection pressure guide path 71 (corresponding to differential pressure detection pressure guide path 15 of FIG. 4) is formed so as to be continuous with the first inflow path 43 on the lower side. The one differential pressure detection pressure guide path 71 is formed such that one end thereof is open between the continuation center position 70 of the second inflow path 67 and the first inflow path 43 and one end of the first inflow path 43. One end of the one differential pressure detection pressure guide path 71 has the function of a differential pressure extraction port. The one differential pressure detection pressure guide path 71 is formed so as to extend straightly downwards. The one differential pressure detection pressure guide path 71 is a path for detecting differential pressure, and its diameter is set smaller than that of the first inflow path 43.

The other differential pressure detection pressure guide path 72 (corresponding to differential pressure detection pressure guide path 15 of FIG. 4) is formed so as to be continuous with the first outflow path 44 on the upper side. The other differential pressure detection pressure guide path 72 is formed such that one end thereof is open at a position more spaced apart from the fluid outflow port 35 with respect to the continuation center position 69 of the second outflow path 66 and the first outflow path 44. One end of the other differential pressure detection pressure guide path 72 has the function of a differential pressure extraction port. In this embodiment, the other differential pressure detection pressure guide path 72 is formed in conformity with the end portion position of the first outflow path 44. The other differential pressure detection pressure guide path 72 is formed so as to extend straightly downwards. The other differential pressure detection pressure guide path 72 is formed so as to be parallel to the one differential pressure detection pressure guide path 71. The other differential pressure detection pressure guide path 72 is a path for detecting differential pressure, and its diameter is set smaller than that of the first outflow path 44.

The description of the one differential pressure detection pressure guide path 71 and the other differential pressure detection pressure guide path 72 will be summarized. The one differential pressure detection pressure guide path 71 and the other differential pressure detection pressure guide path 72 are formed so as to be arranged longitudinally side by side at a predetermined interval. Further, the one differential pressure detection pressure guide path 71 is connected on the front side of the continuation center position 70 of the second inflow path 67 and the first inflow path 43, and the other differential pressure detection pressure guide path 72 is connected on the rear side of the continuation center position 69 of the second outflow path 66 and the first outflow path 44. The connecting positions are set aiming at an arrangement of high efficiency for the piston 17, etc. of the differential pressure detecting means 6 (whereby it is advantageously possible to achieve a reduction in the longitudinal dimension of the volumetric flowmeter 1 even if the differential pressure detecting means 6 is integrated with the front side main body casing 8. (For example, if the one differential pressure detection pressure guide path 71 is shifted rearwards, it is necessary to shift the components of the differential pressure detecting means 6 rearwards by this shifting amount, resulting in a rearwardly enlarged structure).)

A differential pressure detecting portion 73 (corresponding to the differential pressure detecting portion 16 of FIG. 4) is formed at the other ends of the one differential pressure detection pressure guide path 71 and the other differential pressure detection pressure guide path 72 so as to be continuous therewith.

Here, the specific components of the differential pressure detecting means 6 and the portions related thereto will be named. A description of their operation, etc. will be omitted. (The description given with reference to FIG. 4 is to be referred to.)

Reference numeral 17 indicates a piston. Reference numeral 18 indicates a light emission side photoelectric sensor. Reference numeral 19 indicates a light emission side photoelectric sensor. Those are basically the same as those shown in FIG. 4.

Reference numeral 74 indicates a photoelectric sensor case (see FIG. 5). Reference numeral 75 indicates a photoelectric sensor mounting plate. Reference numeral 76 indicates photoelectric sensor packing. Reference numeral 77 indicates glass-paned window packing. Reference numeral 78 indicates a photoelectric sensor mounting bolt. Reference numeral 79 indicates tempered glass. Reference numeral 80 indicates a tempered glass O-ring. Reference numeral 81 indicates a photoelectric sensor positioning pin. Reference numeral 82 indicates photoelectric sensor case mounting bolts.

Reference numeral 83 indicates a cylinder front side cover. Reference numeral 84 indicates a sleeve (see FIG. 6). Reference numeral 85 indicates a cylinder cover O-ring. Reference numeral 86 indicates a cylinder rear side cover. The sleeve 84 has a portion 87 matching a part of the other differential pressure detection pressure guide path 72 with the position of the piston 17.

As described above with reference to FIGS. 1 through 15, the volumetric flowmeter 1 has a construction in which the pump unit 2 having the pump portion 12 is accommodated in the unit accommodating recess 11 of the main body casing 3 (front side main body casing 8) to be covered with the cover member 4, with the unit accommodating recess 11 and the cover member 4 forming a portion functioning as a pressure container. The pump unit 2 has a construction in which the fluid to be measured flows within the inner space thereof and in which the entire outer space thereof is filled with the fluid to be measured. In the pump unit 2, the fluid pressures applied to the inner and outer side thereof are equalized.

In the volumetric flowmeter 1, it is the cover member 4 functioning, for example, as a pressure container that undergoes temporary deformation due to fluid pressure, and the pump unit 2 itself undergoes no deformation. Thus, the volumetric flowmeter 1 is capable of high precision measurement. Apart from this, the volumetric flowmeter 1 provides the following effects.

In the volumetric flowmeter 1, there is no need for the pump portion casing 25 of the pump unit 2 to be formed as a pressure container, so it is possible to reduce the wall thickness, for example, of the pump portion casing 25. Thus, the pump unit 2 can be relatively small. (By making the size of the pump unit 2 relatively small, it is also possible to realize a satisfactory workability at the time of replacement.)

Further, in the volumetric flowmeter 1, the rotor shaft 36 is driven through the magnetic joint 63, so not only is there no fear of liquid leakage, but it is also possible to smoothly rotate the rotor shaft 36. Thus, as compared with the prior art, the volumetric flowmeter 1 helps to achieve an improvement in terms of performance and maintenance. (Although there is not yielded such effects, it is also possible to adopt a construction in which driving is effected by using a conventional seal member.)

Further, due to its construction in which the rotor shafts 36, 39 are of a center-crank-like structure, the volumetric flowmeter 1 can stabilize the rotation of the rotors 14. Due to the center-crank-like structure of the rotor shafts 36, 39, there is no need to set the axial length large as in the case of the cantilever-like structure, with the result that it is possible to reduce the size of the pump portion 12.

Further, in the volumetric flowmeter 1, the pump portion casing 25 of the pump unit 2 is formed by three separable plates, one of which can be replaced according to the size of the rotors 14, so it is also possible to take into consideration the ease with which replacement is performed when the flow rate range is changed.

Further, in the volumetric flowmeter 1, the position where differential pressure is extracted is close to the pump portion 12, and the differential pressure detecting means 6 is integrated with the main body casing 3 (front side main body casing 8), so it is possible to enhance the precision in differential pressure detection as compared with that in the prior art.

As a matter of course, the present invention allows various modifications without departing from the gist of the present invention.

The invention claimed is:

1. A servo type volumetric flowmeter employing a pump unit system, comprising a pump unit formed by providing inside a pump portion casing a pump portion having a first rotor and a second rotor having rotation shafts and a measuring chamber formed so as to surround the first rotor and the second rotor,
wherein the pump unit has
a fluid inflow port communicating with the measuring chamber,
a fluid outflow port, and
a pressure guide port formed in the pump portion casing,
with one of the rotor shafts extending to an exterior of the pump portion casing as a drive shaft,
wherein the servo type volumetric flowmeter with the pump unit further includes
a main body casing,
a unit accommodating recess formed in the main body casing and detachably accommodating the pump unit,
a cover member covering the unit accommodating recess and fixed to the main body casing,
an inflow path formed in the main body casing and guiding a fluid to be measured toward the pump unit, the inflow path being continuous with the fluid inflow port,
an outflow path formed in the main body casing and guiding the fluid to be measured to an exterior of the main body casing from the pump unit in the recess of the unit accommodating recess, the outflow path being continuous with the fluid outflow port,
a shaft driving unit mounted to the main body casing and driving one of the rotor shafts extending from the pump portion casing,
a differential pressure detector for detecting a differential pressure between front and rear sides of the first rotor and the second rotor, and
a controller for controlling the shaft driving unit based on the differential pressure, and
wherein, due to a presence of the pressure guide port, both inner and outer surfaces of the pump unit, which is accommodated in the unit accommodating recess and covered with the cover member, are kept wet, with the fluid pressures applied to inner and outer sides of the pump unit being equalized.

2. A servo type volumetric flowmeter employing a pump unit system according to claim 1,
wherein a main body mounting portion formed on the main body casing in order to mount the main body of the shaft driving means is isolated from the unit accommodating recess to shut off the fluid to be measured, and
wherein the shaft driving means is constructed such that one of the rotor shafts is driven through a magnetic joint.

3. A servo type volumetric flowmeter employing a pump unit system according to claim 2, wherein the rotor shafts of the first rotor and the second rotor are supported in a center-crank-like fashion with respect to the pump portion casing.

4. A servo type volumetric flowmeter employing a pump unit system according to claim 3,
wherein the pump portion casing is equipped with
three separable plates composed of
a middle plate having a measuring chamber forming portion extending therethrough in conformity with the configuration of the measuring chamber,
a cover member side plate having a flat surface covering one opening of the measuring chamber forming portion, and
a replaceable rotor shaft extension side plate having a flat surface covering the other opening of the measuring chamber forming portion or a recess constituting a part of the measuring chamber, and
a plurality of screws for fixing to each other the three plates stacked together, and
wherein the pump portion casing when the three plates are stacked together has a fixed thickness and is detachable with respect to the unit accommodating recess.

5. A servo type volumetric flowmeter employing a pump unit system according to claim 4,
wherein the main body casing has a pair of differential pressure detection pressure guide paths each of which has at one end thereof a differential pressure extraction port for differential pressure detection and a differential pressure detecting portion continuous with the other ends of the pair of differential pressure detection pressure guide paths, and
wherein the differential pressure detecting means is integrated with the main body casing at a position in a vicinity of the unit accommodating recess.

6. A servo type volumetric flowmeter employing a pump unit system according to claim 3,
wherein the main body casing has a pair of differential pressure detection pressure guide paths each of which has at one end thereof a differential pressure extraction port for differential pressure detection and a differential pressure detecting portion continuous with the other ends of the pair of differential pressure detection pressure guide paths, and
wherein the differential pressure detecting means is integrated with the main body casing at a position in a vicinity of the unit accommodating recess.

7. A servo type volumetric flowmeter employing a pump unit system according to claim 2,
wherein the pump portion casing is equipped with
three separable plates composed of
a middle plate having a measuring chamber forming portion extending therethrough in conformity with the configuration of the measuring chamber,
a cover member side plate having a flat surface covering one opening of the measuring chamber forming portion, and
a replaceable rotor shaft extension side plate having a flat surface covering the other opening of the measuring chamber forming portion or a recess constituting a part of the measuring chamber, and
a plurality of screws for fixing to each other the three plates stacked together, and wherein the pump portion casing when the three plates are stacked together has a fixed thickness and is detachable with respect to the unit accommodating recess.

8. A servo type volumetric flowmeter employing a pump unit system according to claim 7,
wherein the main body casing has a pair of differential pressure detection pressure guide paths each of which has at one end thereof a differential pressure extraction port for differential pressure detection and a differential pressure detecting portion continuous with the other ends of the pair of differential pressure detection pressure guide paths, and
wherein the differential pressure detecting means is integrated with the main body casing at a position in a vicinity of the unit accommodating recess.

9. A servo type volumetric flowmeter employing a pump unit system according to claim 2,
wherein the main body casing has a pair of differential pressure detection pressure guide paths each of which has at one end thereof a differential pressure extraction port for differential pressure detection and a differential pressure detecting portion continuous with the other ends of the pair of differential pressure detection pressure guide paths, and
wherein the differential pressure detecting means is integrated with the main body casing at a position in a vicinity of the unit accommodating recess.

10. A servo type volumetric flowmeter employing a pump unit system according to claim 1, wherein the rotor shafts of the first rotor and the second rotor are supported in a center-crank-like fashion with respect to the pump portion casing.

11. A servo type volumetric flowmeter employing a pump unit system according to claim 10,
wherein the pump portion casing is equipped with
three separable plates composed of
a middle plate having a measuring chamber forming portion extending therethrough in conformity with the configuration of the measuring chamber,
a cover member side plate having a flat surface covering one opening of the measuring chamber forming portion, and
a replaceable rotor shaft extension side plate having a flat surface covering the other opening of the measuring chamber forming portion or a recess constituting a part of the measuring chamber, and
a plurality of screws for fixing to each other the three plates stacked together, and
wherein the pump portion casing when the three plates are stacked together has a fixed thickness and is detachable with respect to the unit accommodating recess.

12. A servo type volumetric flowmeter employing a pump unit system according to claim 11,
wherein the main body casing has a pair of differential pressure detection pressure guide paths each of which has at one end thereof a differential pressure extraction port for differential pressure detection and a differential pressure detecting portion continuous with the other ends of the pair of differential pressure detection pressure guide paths, and
wherein the differential pressure detecting means is integrated with the main body casing at a position in a vicinity of the unit accommodating recess.

13. A servo type volumetric flowmeter employing a pump unit system according to claim 10,
wherein the main body casing has a pair of differential pressure detection pressure guide paths each of which has at one end thereof a differential pressure extraction port for differential pressure detection and a differential pressure detecting portion continuous with the other ends of the pair of differential pressure detection pressure guide paths, and
wherein the differential pressure detecting means is integrated with the main body casing at a position in a vicinity of the unit accommodating recess.

14. A servo type volumetric flowmeter employing a pump unit system according to claim 1,
wherein the pump portion casing is equipped with
three separable plates composed of
a middle plate having a measuring chamber forming portion extending therethrough in conformity with the configuration of the measuring chamber,
a cover member side plate having a flat surface covering one opening of the measuring chamber forming portion, and
a replaceable rotor shaft extension side plate having a flat surface covering the other opening of the measuring chamber forming portion or a recess constituting a part of the measuring chamber, and
a plurality of screws for fixing to each other the three plates stacked together, and
wherein the pump portion casing when the three plates are stacked together has a fixed thickness and is detachable with respect to the unit accommodating recess.

15. A servo type volumetric flowmeter employing a pump unit system according to claim 14,
wherein the main body casing has a pair of differential pressure detection pressure guide paths each of which has at one end thereof a differential pressure extraction port for differential pressure detection and a differential pressure detecting portion continuous with the other ends of the pair of differential pressure detection pressure guide paths, and
wherein the differential pressure detecting means is integrated with the main body casing at a position in a vicinity of the unit accommodating recess.

16. A servo type volumetric flowmeter employing a pump unit system according to claim 1,
wherein the main body casing has a pair of differential pressure detection pressure guide paths each of which has at one end thereof a differential pressure extraction port for differential pressure detection and a differential pressure detecting portion continuous with the other ends of the pair of differential pressure detection pressure guide paths, and
wherein the differential pressure detecting means is integrated with the main body casing at a position in a vicinity of the unit accommodating recess.

17. A servo type volumetric flowmeter employing a pump unit system according to claim 16, wherein the differential pressure extraction port is formed in the inflow port and the outflow port opening in the unit accommodating recess.

* * * * *